United States Patent [19]

Matesa

[11] Patent Number: 4,545,798
[45] Date of Patent: Oct. 8, 1985

[54] ABLATING LIQUEFACTION EMPLOYING PLASMA

[75] Inventor: Joseph M. Matesa, Plum Boro, Pa.

[73] Assignee: PPG Industries, Inc., Pittsburgh, Pa.

[21] Appl. No.: 500,542

[22] Filed: Jun. 2, 1983

[51] Int. Cl.$^4$ ............................................. C03B 5/10
[52] U.S. Cl. ............................................ 65/27; 65/134; 65/135; 65/335; 65/337; 266/213; 432/264
[58] Field of Search .................. 65/27, 134, 135, 335, 65/337; 266/213; 432/264

[56] References Cited

U.S. PATENT DOCUMENTS

| | | |
|---|---|---|
| 296,227 | 4/1884 | Schulze-Berge . |
| 682,365 | 9/1901 | Mount . |
| 698,766 | 4/1902 | Voelker . |
| 708,309 | 9/1902 | Bronn . |
| 908,151 | 12/1908 | Schwenzfeier . |
| 1,082,195 | 12/1913 | Helfenstein . |
| 1,371,084 | 3/1921 | Ferguson . |
| 1,577,602 | 3/1926 | Amsler . |
| 1,621,446 | 3/1927 | Watson . |
| 1,863,708 | 6/1932 | Zotos .......................... 65/134 X |
| 1,870,636 | 8/1932 | McIntyre et al. . |
| 1,877,714 | 9/1932 | Bulask ............................ 65/134 |
| 1,889,509 | 11/1932 | Amsler . |
| 1,889,511 | 11/1932 | Amsler . |
| 1,928,598 | 9/1933 | Morton et al. . |
| 1,953,023 | 3/1934 | Mulholland . |
| 1,999,761 | 4/1935 | Howard . |
| 1,999,762 | 4/1935 | Howard . |
| 2,006,947 | 7/1935 | Ferguson . |
| 2,007,755 | 7/1935 | Ferguson . |
| 2,074,819 | 3/1937 | Weitzenkorn . |
| 2,154,737 | 4/1939 | Erdmann . |
| 2,262,070 | 11/1941 | Turk . |
| 2,358,903 | 9/1944 | Zotos . |
| 2,398,952 | 4/1946 | Nachod . |
| 2,451,582 | 10/1948 | Smith . |
| 2,455,907 | 12/1948 | Slayter . |
| 2,593,197 | 4/1952 | Rough . |
| 2,834,157 | 5/1958 | Bowes . |
| 2,878,004 | 3/1959 | Saeman ........................... 65/27 X |
| 3,077,094 | 2/1963 | Jack et al. . |
| 3,109,045 | 10/1963 | Silverman . |
| 3,151,964 | 10/1964 | North . |
| 3,328,149 | 6/1967 | Keefer . |

(List continued on next page.)

FOREIGN PATENT DOCUMENTS 400472  2/1932  United Kingdom .

OTHER PUBLICATIONS

Grosse, A., et al., "The Centrifugal Plasma Jet Furnace," Material Research & Standards, Apr. 1965, pp. 173–177.
Whyman, D., "A Rotating-Wall, D.C.-Arc Plasma Furnace," J. Sci. Instrum., 1967, vol. 44, pp. 525–530.
Selton, B., et al., "The Centrifugal Liquid Wall Furnace," J. Materials Science, vol. 4, 1969, pp. 302–309.
Foex, M., et al., "A Plasma Transferred Arc Heated High Temperature Rotary Furnace," Fifth Symposium on Special Ceramics, Stoke-on-Trent, G.B., 1970, pp. 175–183.
Foex, M., et al., "High Temperature Rotary Furnace for Melting Refractory Materials Heated Along Central Axis by Plasma Torches," International Conference on Gas Discharges, London, 1970, pp. 241–245.
Everest, D., et al., "Preparation of Ultrafine Alumina Powders by Plasma Evaporation," J. Materials Science, vol. 6, 1971, pp. 218–224.
Yerouchalmi, D., "Four Rotatif a Plasma," Electrotherm Company, Brussels, Date Unknown.

Primary Examiner—Robert Lindsay
Attorney, Agent, or Firm—Dennis G. Millman

[57] ABSTRACT

Converting thermally meltable materials to a liquefied state is carried out by a plasma heat source encircled by a layer of the unmelted material. As liquefied material is drained from the surface, additional unmelted material is fed onto the surface to maintain a substantially constant layer of the unmelted material, thereby maintaining the temperature of the melting vessel relatively low and eliminating the need for forced cooling of the vessel.

15 Claims, 2 Drawing Figures

U.S. PATENT DOCUMENTS

| | | | |
|---|---|---|---|
| 3,510,289 | 5/1970 | Boivent | |
| 3,526,492 | 9/1970 | Motsch | 65/337 X |
| 3,637,365 | 1/1972 | Oulton | |
| 3,689,679 | 9/1972 | Niwa et al. | |
| 3,917,479 | 11/1975 | Sayce et al. | |
| 3,944,713 | 3/1976 | Plumat | |
| 4,061,487 | 12/1977 | Kiyonaga | |
| 4,062,667 | 12/1977 | Hatanaka et al. | |
| 4,110,097 | 8/1978 | Chevallier et al. | |
| 4,113,459 | 9/1978 | Mattmuller | 65/135 |
| 4,138,238 | 2/1979 | Strickland | 65/335 X |
| 4,185,984 | 1/1980 | Kiyonaga | |
| 4,188,201 | 2/1980 | Jung | |
| 4,381,934 | 5/1983 | Kunkle et al. | 65/135 |

ABLATING LIQUEFACTION EMPLOYING PLASMA

BACKGROUND OF THE INVENTION

The present invention relates to converting pulverulent raw materials to a liquefied state as a first step in a melting process. The invention is particularly applicable to melting glass, including flat glass, container glass, fiber glass, and sodium silicate glass. But the invention is applicable to other processes that involve thermally converting a generally flowable, essentially solid state feed material to a molten fluid. These other processes may include metallurgical smelting type operations and fusing of single or multiple component ceramics, metals, or other materials. More particularly, this invention is an improvement in the invention disclosed in U.S. Pat. No. 4,381,934 and U.S. patent application Ser. No. 481,970 filed Apr. 4, 1983, both by G. E. Kunkle and J. M. Matesa.

Continuous glass melting processes conventionally entail depositing pulverulent batch materials onto a pool of molten glass maintained within a tank type melting furnace and applying thermal energy until the pulverulent materials are melted into the pool of molten glass.

The conventional tank type glass melting furnace possesses a number of deficiencies. A basic deficiency is that several operations, not all of which are compatible with one another, are carried out simultaneously within the same chamber. Thus, the melter chamber of a conventional furnace is expected to liquefy the glass batch, to dissolve grains of the batch, to homogenize the melt, and to refine the glass by freeing it of gaseous inclusions. Because these various operations are taking place simultaneously within the melter, and because different components of the glass batch possess different melting temperatures, it is not surprising that inhomogeneities exist from point to point within the melter.

In order to combat these inhomogeneities, a melting tank conventionally contains a relatively large volume of molten glass so as to provide sufficient residence time for currents in the molten glass to effect some degree of homogenization before the glass is discharged to a forming operation. These recirculating flows in a tank type melter result in inefficient use of thermal energy, and maintaining the large volume of molten glass itself presents difficulties, including the need to heat such a large chamber and the need to construct and maintain such a large chamber made of costly and, in some cases, difficult to obtain refractory materials. Moreover, erosion of the refractories introduces contaminants into the glass and requires rebuilding of the melter in a matter of a few years. Additionally, it is known that some components of the batch such as limestone, tend to melt out earlier than the sand and sink into the melt as globules, whereas higher melting temperature components, such as silica, tend to form a residual unmelted scum on the surface of the melt. This segregation of batch components further aggravates the problem of inhomogeneities.

Recent findings have indicated that a major rate limiting step of the melting process is the rate at which partly melted liquefied batch runs off the batch pile to expose underlying portions of the batch to the heat of the furnace. The conventional practice of floating a layer of batch on a pool of molten glass is not particularly conducive to aiding the runoff rate, due in part to the fact that the batch is partially immersed in the molten glass. It has also been found that radiant energy is considerably more effective at inducing runoff than is convective heat from the pool of molten glass, but in a conventional melter, only one side of the batch is exposed to overhead radiant heat sources. Similarly, conventional overhead radiant heating is inefficient in that only a portion of its radiant energy is directed downwardly towards the material being melted. Not only is considerable energy wasted through the superstructure of the furnace, but the resulting thermal degradation of the refractory roof components constitutes a major constraint on the operation of many glass melting furnaces. Furthermore, attempting to heat a relatively deep recirculating mass of glass from above inherently produces thermal inhomogeneities which can carry over into the forming process and affect the quality of the glass products being produced.

Many proposals have been made for overcoming some of the problems of the conventional tank type glass melting furnace, but none has found significant acceptance since each proposal has major difficulties in its implementation. It has been proposed, for example, that glass batch be liquefied on a ramp-like structure down which the liquid would flow into a melting tank (e.g., U.S. Pat. Nos. 296,227; 708,309; 2,593,197; 4,062,667; and 4,110,097). The intense heat and severely corrosive conditions to which such a ramp would be subjected has rendered such an approach impractical since available materials have an unreasonably short life in such an application. In some cases, it is suggested that such a ramp be cooled in order to extend its life, but cooling would extract a substantial amount of heat from the melting process and would diminish the thermal efficiency of the process. Also, the relatively large area of contact between the ramp and each unit volume of glass throughput would be a concern with regard to the amount of contaminants that may be picked up by the glass. Furthermore, in the ramp approach, heat transfer from a radiant source to the melting batch materials is in one direction only.

A variation on a ramp type melter is shown in U.S. Pat. No. 2,451,582 where glass batch materials are dispersed in a flame and land on an inclined ramp. As in other such arrangements, the ramp in the patented arrangement would suffer from severe erosion and glass contamination.

The prior art has also suggested melting glass in rotating vessels where the melting material would be spread in a thin layer on the interior surface of the vessel and would, more or less, surround the heat source (e.g., U.S. Pat. Nos. 1,889,509; 1,889,511; 2,006,947; 2,007,755; 4,061,487; and 4,185,984). As in the ramp proposals, the prior art rotary melters possess a severe materials durability problem and an undesirably large surface contact area per unit volume of glass throughput. In those embodiments where the rotating vessel is insulated, the severe conditions at the glass contact surface would indicate a short life for even the most costly refractory materials and a substantial contamination of the glass throughput. In those embodiments where the vessel is cooled on the exterior surface, heat transfer through the vessel would subtract substantial amounts of thermal energy from the melting process, which would adversely affect the efficiency of the process. In a rotary melter arrangement shown in U.S. Pat. No. 2,834,157 coolers are interposed between the melting material and the refractory vessel in order to preserve the refractories, and it is apparent that great thermal losses would be experienced in such an arrangement. In cyclone type melters, as shown in U.S. Pat. Nos. 3,077,094 and 3,510,289, rotary motion is imparted to the glass batch materials by gaseous means as the vessel remains stationary, but the cyclone arrangements possess all the disadvantages of the rotary melters noted above.

Some prior art processes conserve thermal energy and avoid refractory contact by melting from the interior of a mass of glass batch outwardly, including U.S. Pat. Nos. 1,082,195; 1,621,446; 3,109,045; 3,151,964; 3,328,149; and 3,689,679. Each of these proposals requires the use of electric heating and the initial liquefaction of the batch materials depends upon convective or conductive heating through the mass of previously melted glass. This is disadvantageous because radiant heating has been found to be more effective for the initial liquefaction step. Additionally, only the last two patents listed disclose continuous melting processes. In a similar arrangement disclosed in U.S. Pat. No. 3,637,365, one embodiment is disclosed wherein a combustion heat source may be employed to melt a preformed mass of glass batch from the center outwardly, but it, too, is a batchwise process and requires the melting to be terminated before the mass of glass batch is melted through.

The use of an electric plasma heat source (variously termed plasma arc, plasma jet, plasma torch) has long been recognized as desirable for melting applications because of the extremely high temperatures that can be attained. A major difficulty is providing a vessel that can withstand such high temperatures. Cooling of the melting vessel has been employed to reduce erosion of the vessel, but the resulting extraction of heat significantly reduces the thermal efficiency of the overall process. Therefore, plasma melting has been considered impractical for large scale commercial glass melting operations and the like.

An electric arc source can also generate extremely high temperatures, but a plasma heat source has advantages thereover in the type of melting process to which the present invention pertains. A cumbersome feature of an electric arc is that at least two electrodes must extend into the melting zone itself so that radiation from the arc directly impinges upon the material being melted. With a plasma torch, however, the plasma may be initiated outside the main melting zone and transported into the melting zone by means of the gas stream. Also, consumption of arc electrodes produces CO and/or $CO_2$ and can cause undesirable reduction reactions in the glass.

SUMMARY OF THE INVENTION

In the present invention, the initial step in a melting process, the liquefying of a raw material such as glass batch, is carried out by means of a plasma heat source. It has been found that a plasma heat source can be used to advantage in an ablating liquefaction process wherein the heat source is in a central cavity surrounded by a lining, at least the surface portion of which comprises a material of essentially the same composition as the raw material and/or the product. The raw material is fed at such a rate as to maintain a stable layer of the material encircling the heated cavity that is of sufficient thickness to insulate the underlying vessel structure from the heat without the need for forced cooling of the vessel. By permitting the liquefied material to flow out of the vessel as soon as it reaches a flowable condition, and by feeding additional raw materials onto the surface of the lining to replace the liquefied material flowing out, heat is quickly removed from the vessel at about the liquefying temperature of the material, and the lining temperature does not rise above that temperature regardless of the temperature of the heat source. Melting is substantially confined to a transient layer on the surface of the stable layer of the lining. Therefore, the very high temperature of a plasma heat source can be advantageously utilized for its high heat transfer rate to produce a large throughput without incurring contamination from contact with a refractory wall material, and without sacrificing efficiency by cooling the vessel.

THE DRAWINGS

DETAILED DESCRIPTION

The invention will be described in conjunction with a preferred embodiment for melting glass, but it should be understood that the invention is not limited to the specific embodiment nor to the melting of glass.

Also, since the invention relates to the initial step of liquefying glass batch, the description of the embodiment will be limited to what would be only the initial portion of most glass melting operations. It should be understood that where the product requires, the inventive liquefaction step may be employed in combination with conventional means for further melting, refining, conditioning and forming the glass.

Glass batch liquefying means of various types that are compatible with the present invention are disclosed in U.S. Pat. No. 4,381,934 of G. E. Kunkle and J. M. Matesa, the disclosure of which is hereby incorporated by reference.

Figure 1:
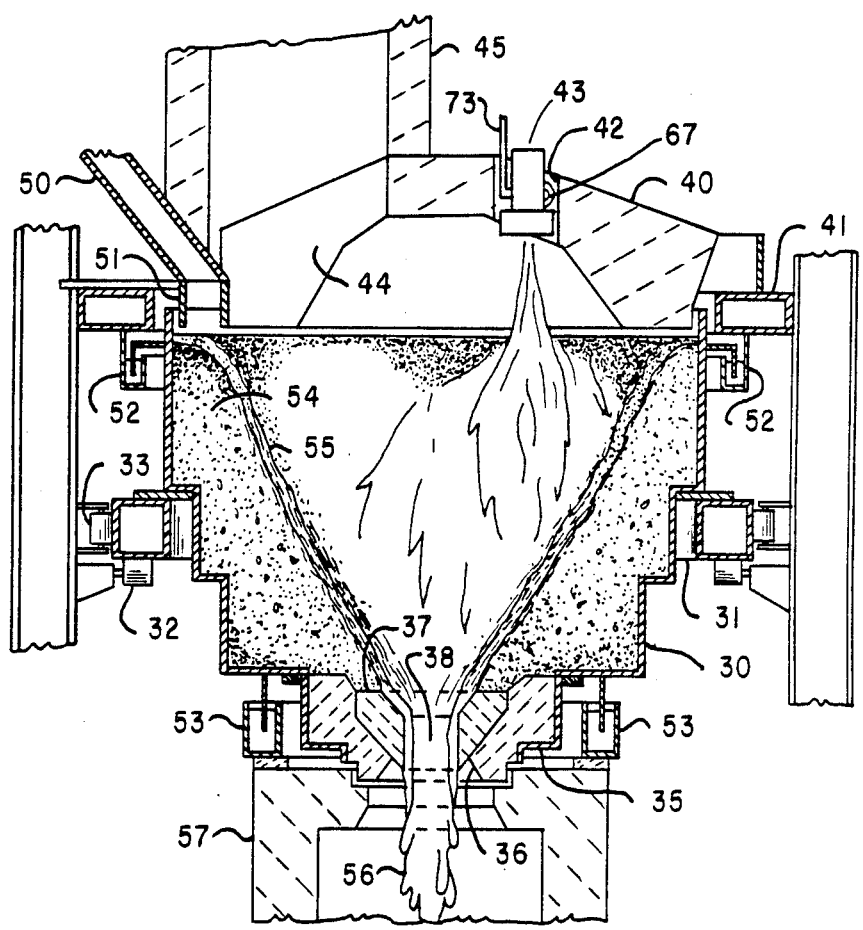
FIG. 1 is a vertical cross-section of a preferred embodiment of the present invention wherein a drum rotating about a vertical axis of rotation provides a batch surface which is a paraboloid surface of rotation about a plasma heat source.
Figure 2:
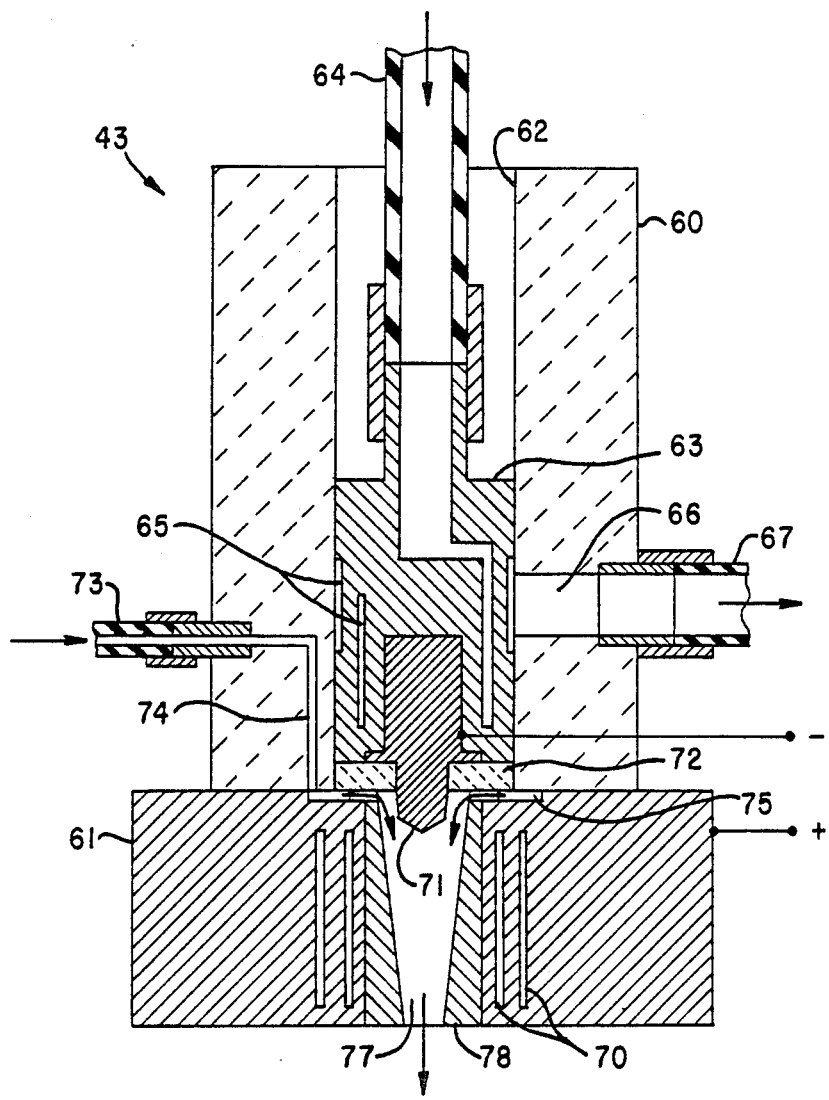
FIG. 2 is an enlarged cross-section of a specific embodiment of plasma torch that may be used with the present invention.

FIG. 1 shows a specific preferred embodiment of the present invention. In FIG. 1, a drum 30 has stepped sides so as to decrease the amount of mass being rotated. The drum could, of course, be a conical or cylindrical shape, but the stepped construction is preferred for ease of fabrication and reduced mass. The drum 30 is supported on a circular frame 31 which is, in turn, mounted for rotation about a generally vertical axis corresponding to the center line of the drum on a plurality of support rollers 32 and aligning rollers 33. A bottom section 35 houses an outlet assembly which may be detached from the remainder of the drum. The housing 35 may be lined with an annulus of refractory material 36 such as castable refractory cement in which is seated a ring-like bushing 37 of erosion resistant refractory. The bushing 37 may be comprised of a plurality of cut pieces of ceramic. An open center 38 in the bushing 37 comprises the outlet opening from the liquefaction chamber. An upwardly domed refractory lid 40 is provided with stationary support by way of a circular frame member 41. The lid includes an opening 42 for insertion of a plasma torch 43. In this embodiment the exhaust gases escape upwardly through an opening 44 through the lid 40 and into an exhaust duct 45. The opening 44 may also be utilized for feeding the raw materials to the liquefaction chamber, and a feed chute 50 may be provided for this purpose. The bottom end of the feed chute 50 may be provided with a movable baffle 51 for the purpose of controlling the location at which the raw materials are deposited into the liquefaction chamber. Upper and lower water seals 52 and 53 respectively, may be provided to isolate the interior of the liquefaction chamber from the exterior ambient conditions and to trap any dust or vapors that may escape from the vessel. A stable layer of unmelted material 54 is maintained within the liquefaction chamber and on this stable layer a transient layer 55 melts and flows downwardly through the bushing outlet 38. The liquefied material 56 then falls into a collection vessel 57.

In the liquefaction vessel of the present invention, the batch layer encircles the radiant heat source. Such an arrangement advantageously results in a greater portion of the radiant energy productively impinging upon the batch material and permits greater utilization of the insulative effect of the batch layer. Because the heat source is encircled by the insulating batch layer, refractory materials need not be employed for the sidewalls of the housing. Thus, the housing may comprise a steel vessel which may be provided with a frustoconical shape, which may be generally parallel to the interior surface of the batch layer. However, the sloped surface of the batch layer need not correspond to the shape of the housing, and the housing may take any form such as a cylindrical or box shape. A sloping, stable batch layer lines the sides of the interior of the liquefaction vessel and may be comprised of loose batch or a preformed, molded lining. As shown in the drawing, the surface of the batch layer facing the heat source is preferably a surface of rotation, in this case a generally paraboloid shape. Frusto-conical and cylindrical surfaces may also be employed. It may be also noted that the batch layer need not be of uniform thickness as long as the minimum thickness is sufficient to provide the desired degree of insulation. Because of the excellent insulating properties of glass batch, a stable batch layer whose minimum thickness is on the order of about 3 centimeters to 5 centimeters has been found more than adequate to protect a steel housing from undue thermal deterioration. A thickness of about 10 centimeters is preferred to provide a margin of safety.

In the preferred embodiment the vessel and the layer of material being melted is rotated about the heat source, but the rotation is not essential. Rotating the vessel is preferred because loose batch materials are held on the interior walls of the vessel facing the heated cavity at a more perpendicular attitude, thereby improving heat transfer. A steep batch surface also expedites draining of the liquefied material from the vessel. Rotating the vessel also simplifies distributing the feed stream around the interior of the vessel. A pre-molded batch layer, on the other hand, need not be rotated to provide a steep slope. In the preferred embodiment the axis of the drum and the coincident axis of rotation are vertical. But the axis in some cases may be inclined at an angle relative to vertical. The angle of incline of the rotating cylinder will be determined by the rate at which it is desired for the liquefied batch to run out of the cylinder. The cylinder should rotate at a speed at which loose batch is held against the inside walls by centrifugal force. The minimum speed will depend upon the effective diameter of the cylinder. The following are calculated estimates:

| Diameter | Revolutions per Minute |
| --- | --- |
| 0.5 Meters | 60 |
| 1.0 Meters | 43 |
| 2.0 Meters | 37 |

Before the vessel is heated, a stable layer of batch is provided in the vessel by feeding loose batch while the housing is rotated. The loose batch assumes a generally paraboloid contour as shown in FIG. 1. The shape assumed by loose, dry batch is related to the speed of rotation as follows:

$$H = \mu R + (2\pi^2 \omega^2 R^2)/g$$

Where:
 H = the elevation of a point on the batch surface in the direction parallel to the axis of rotation;
 R = the radial distance of that point from the axis of rotation;
 $\mu$ = a friction factor;
 $\omega$ = angular velocity; and
 g = the acceleration of gravity.

The friction factor may be taken as the tangent of the angle of repose, which for dry glass batch is typically about 35°. The above equation may be employed to select suitable dimensions for the rotary vessel at a selected speed of rotation or, conversely, for determining a suitable speed of rotation for a given vessel. The relationship shows that steeper slopes, which are generally preferred, require faster rotational speeds, and that at zero velocity, the slope is determined solely by the angle of repose (assuming no preforming of the batch layer).

During heating, continuous feeding of batch to the vessel of FIG. 1 results in a falling stream of batch that becomes distributed over the surface of the stable batch layer, and by the action of the heat becomes liquefied in a transient layer 55 that runs to the bottom of the vessel and passes through opening 38. During operating, the rate of feeding the batch and the rate of heating are balanced against one another so that the batch layer remains stable and serves as the surface upon which newly fed batch is melted and runs toward the lower end of the cylinder. The liquefied batch falls as globules 56 from the exit opening and may be collected in a vessel for further processing.

Plasma heat sources are commercially available from a number of suppliers and vary in power level and configuration. The example of a plasma torch shown in the drawings is sold by Thermal Dynamics Corp., West Lebanon, N.H., under the name "Thermal Arc M-80 50N." The major structural components of the plasma torch are a cathode body 60 and an anode body 61 which may be bolted together. The cathode body 60 is a generally cylindrical member of electrical insulating material having a central bore 62 within which is received a cathode holder 63. The cathode holder 63 is connected to a cooling water supply conduit 64 which provides a flow of water (preferably de-ionized water) to annular passages 65 in the cathode holder. The cooling water escapes through a bore 66 in the side of the cathode body 60 and through a conduit 67. The conduit 67 carries the water to the anode body 61 where the water is circulated through annular passage 70. Another conduit (not shown) carries the water from the anode body 61 to a waste drain or heat exchanger for recycling.

A cathode 71 is received in a recess in the end of the cathode holder 63. A ring 72 of insulating material maintains the cathode spaced from the anode body. A gas supply conduit 73 is coupled to a bore 74 through the cathode body 60. The bore 74 leads to the interface between the anode body 61 and the ring 72 wherein there is provided an annular groove 75 and a plurality of tangential grooves in communication therewith so as to induce the gas to flow uniformly around the tip of the cathode 71 into the orifice 77 of the output nozzle as defined by an insert 78 held in the anode body 61.

Cathode 71 is connected to the negative side of a high voltage electric potential and the anode body 61 is connected to the positive side. An arc is created between the cathode 71 and the liner 78 across the path of the gas entering the nozzle 77. The arc excites atoms of the gas whereby they shed electrons and produce a plasma stream comprised of a mixture of ions, electrons, and sometimes neutral atoms. Intense energy is radiated from the plasma due to collisions among the highly excited particles and from recombination of electrons with the ionized atoms. The energy release from a plasma can be much greater than that from combustion. The onset of ionization is typically associated with localized temperatures in excess of 5,000° K., and thus a plasma heat source can be generally characterized by temperature of about 5,000° K. or greater.

Any inert gas may be used with the plasma torch such as argon, helium or nitrogen. Other gases which may be employed include oxygen, carbon monoxide, carbon dioxide and steam. Some gases, particularly oxidizing gases may require available torch designs other than the example shown and described here. Combustible gases such as hydrogen or methane may also be employed, in which case supplying oxygen to the plasma will produce combustion of the gas thereby yielding a combined energy release of the plasma and the combustion. The oxygen may be supplied outside the torch itself downstream fron the nozzle 77. Of particular interest in the melting of glass are helium and steam because of the relative ease with which bubbles of these gases may be dissipated in molten glass thereby easing the task of refining the glass. Moreover, the use of these easily refinable gases can serve to purge the cavity of the liquefaction chamber of more difficult to refine gases such as nitrogen and carbon dioxide so as to prevent their inclusion in the melt, further reducing the need for refining.

A melter using a conventional combustion heat source has a substantial throughput of gases whereby large amounts of energy are carried out of the melter in the exhaust gases. In a conventional glass melting furnace, the volume of the exhaust gases and the amount of energy being contained therein are such that a major expense of such furnaces is in providing heat recovery from the exhaust gases so as to recover some of the enormous amounts of energy that would otherwise be wasted. These heat recovery means (e.g, regenerators or recuperators) in addition to being costly are not as efficient in recovering energy as would be desired. For a given amount of energy output a plasma heat source entails only a fraction of the gas throughput of a fuel/air combustion heat source, and even somewhat less than a fuel/oxygen combustion heat source. Therefore, much less heat is conveyed out of the melting zone by the exhaust gases when a plasma heat source is being used, thus reducing the extent of heat recovery means required for acceptable overall process efficiency.

Plasma torches are available in a variety of sizes and configurations and with varying maximum power levels. Selection of an appropriate plasma torch for a particular application is within the ordinary skill of the art and will depend upon the amount of heat required to liquefy the particular batch material being treated, the desired throughput rate, and the size of the liquefaction vessel.

In a typical glass batch formula consisting primarily of sand, soda ash and limestone, the soda ash begins to melt first, followed by the limestone, and finally the sand. Physical melting is accompanied by chemical interactions, in particular, the molten alkalis attack the sand grains to effect their dissolution at a temperature below the melting point of silica. At some intermediate point in this process, the liquid phase of the heterogeneous mixture of reacting and melting materials begins to predominate and the material becomes flowable as a fluid. The temperature at which the batch becomes flowable will depend upon the particular batch formula, especially the amount and melting temperature of the lowest melting temperature ingredients. The most common low temperature melting ingredient is soda ash, which melts at 1564° F. (851° C.). Theoretically, a batch having a sufficient amount of soda ash may become liquefied at the soda ash melting temperature, but experience with commercial batch formulas indicates that the temperature is somewhat higher—2000° F. (1090° C.) to 2100° F. (1150° C.) for a typical flat glass batch. This may be explained by the fact that batch melting is a complex series of interactions among the various ingredients, whereby the physical properties of the individual ingredients are not exhibited. It may also be that insufficient soda ash is present when melted to entrain by itself the remainder of the unmelted materials. Moreover, even though the present invention eliminates much of the overheating of conventional melters, the runoff temperatures observed with the present invention may not truly represent the initiation of liquefaction, but may include a small amount of heating after liquefaction. Other low temperature melting ingredients sometimes employed in glass batches, such as caustic soda and boric acid, have even lower melting temperatures than soda ash and may behave differently as runoff initiators. On the other hand, some types of glass other than flat glass require higher temperatures to melt. For many types of glasses made on a large scale commercially, the present invention would be expected to operate satisfactorily with liquefied batch draining from the liquefaction chamber at about 1600° F. (870° C.) to 2400° F. (1315° C.).

In the present invention, the liquefied batch drains from the liquefaction zone as soon as it reaches the fluid state, and therefore the fluid draining from the liquefaction zone has a nearly uniform temperature close to the liquefying temperature of the particular batch formula, typically about 2100° F. (1150° C.) in the case of conventional flat glass. Because heat is transported out of the liquefaction zone at the liquefying temperature, which is considerably lower than the temperatures attained in a conventional glass melter, the temperature of the liquefaction vessel may be maintained relatively low regardless of the temperature of the heat source. As a result, materials requirements may be reduced relative to a conventional melter, and use of high temperature heat sources is made possible. The greater heat flux afforded by high temperature heat sources advantageously increases the rate of throughput. The use of a plasma torch is also advantageous in the present invention for the sake of reducing the volume of combustion gases, thereby decreasing any tendency of the fine batch materials to become entrained in the exhaust gas stream. This is particularly significant in the preferred practice of feeding the batch dry to the liquefaction vessel as opposed to the conventional practice of wetting the batch with water to inhibit dusting.

An example of a batch formula employed in the commercial manufacture of flat glass is the following:

| Sand | 1000 | parts by weight |
|---|---|---|
| Soda ash | 313.5 | |
| Limestone | 84 | |
| Dolomite | 242 | |
| Rouge | 0.75 | |

The above batch formula yields approximately the following glass composition:

| $SiO_2$ | 73.10% by weight |
|---|---|
| $Na_2O$ | 13.75% |
| CaO | 8.85% |
| MgO | 3.85% |
| $Al_2O_3$ | 0.10% |
| $Fe_2O_3$ | 0.10% |

The liquefied batch running out of the liquefaction zone of the present invention, when using the batch formula set forth above, is predominantly liquid (weight basis) and includes about 15% by weight or less of crystalline silica (i.e., undissolved sand grains). The liquid phase is predominantly sodium disilicate and includes almost the entire soda ash portion of the batch and most of the limestone and dolomite. The fluid, however, is quite foamy, having a density typically on the order of about 1.9 grams per cubic centimeter, as opposed to a density of about 2.5 grams per cubic centimeter for molten glass.

Although the description of the invention heretofore has related specifically to liquefying glass batch, it should be apparent that the principles of the invention may apply to other materials as well, particularly materials that are initially in a flowable solid form (i.e., granular or pulverulent) and are thermally meltable to a flowable fluid state. Flowability is a desirable characteristic of the feed material for the sake of distributing the material onto the melting surface within the liquefaction chamber. Typically the feed will chiefly comprise subdivided solids, but may include a liquid portion. It is also within the scope of the invention to feed a plurality of streams into the liquefaction chamber, some of which may be liquids. In general, the combined feed for use in the present invention may be characterized as having a greater frictional resistance to flow down the surface of the stable layer than does the liquefied material. Thus, the material initially remains exposed to the heat until it becomes liquefied, whereupon it flows out of the liquefaction zone. Combinations of properties analogous to those in the liquefaction of glass batch may be found in the fusing of ceramic materials and the like and in metallurgical smelting type operations.

Whatever material is being processed, the vessel is insulated from the interior heat by a substantially stable layer of essentially the same material maintained on the interior of the vessel. It is desirable for the thermal conductivity of the material employed as the stable layer to be relatively low so that practical thicknesses of the layer may be employed while avoiding the need for wasteful forced cooling of the vessel exterior. In general, granular or pulverulent mineral source raw materials provide good thermal insulation, but in some cases it may be possible to use an intermediate or product of the melting process as a non-contaminating stable layer. For example, in a glassmaking process, pulverized cullet (scrap glass) could constitute the stable layer, although a thicker layer would be required due to the higher thermal conductivity of glass as compared to glass batch. In metallurgical processes, on the other hand, using a metallic product as the stable layer would entail unduly large thicknesses to provide thermal protection to the vessel, but some ore materials may be satisfactory as insulating layers.

In commercial glassmaking operations, glass batches often include substantial amounts of cullet, or scrap glass. The present invention can accommodate conventional cullet-containing batches, and could be used to melt cullet alone. The cullet may be mixed with the other batch constituents prior to feeding, or the cullet may be fed into the liquefaction zone as a separate stream.

A feature of the invention is that melting takes place in a transient layer that is supported by and flows on a stable layer. It should be understood that the terms "transient" and "stable" are relative, and that a distinct physical demarcation between the transient and stable layers may not always be identifiable. The use of the terms "transient" and "stable" is not intended to preclude the possibility that minor fluctuation of the interface therebetween may occur. The basic distinction is that the region that is described as the transient layer is characterized by melting and flowing, whereas the region termed the stable layer, in at least its major portion, does not participate in the melting and flowing of the thoughput stream. Although the transient layer is said to be "on" the stable layer, one might theoretically define an intermediate layer therebetween, and it should be understood that that possibility is intended to be included. For example, it would be within the ambit of the invention as expressed to feed a plurality of constituents in a stratified manner onto the melting surface.

A purpose of the stable layer is to provide non-contaminating contact with the throughput stream. Therefore, the stable layer is preferably of essentially the same composition as the material being processed. However, it should be understood that precursor or derivative materials would be considered "essentially the same composition" in this context. In other words, the stable layer could be the raw material, the product material, an intermediate, or a different form or mixture thereof, as long as it melts or reacts to form a substance that does not introduce significant amounts of foreign constituents into the throughput stream. It should also be evident that this compositional requirement of the stable layer need apply only to surface portions that actually contact the throughput stream and to portions just under the surface that may occasionally erode into the throughput stream. Therefore, an equivalent arrangement might employ a different material in portions of the stable layer below the level at which erosion is likely to occur. Since this subsurface portion serves primarily as insulation to protect the vessel, it could be composed of a material selected for its thermal insulating properties (e.g., sand or ceramic particles), although it should be sufficiently compatible compositionally to not contaminate the surface layer at the temperatures involved.

Other modifications and variations as would be obvious to those of skill in the art may be resorted to without departing from the scope of the invention as defined by the claims which follow.

I claim:

1. A method of continuously liquefying a stream of pulverulent glassmaking material comprising: directing a stream of free-flowing, solid, thermally meltable, pulverulent, glassmaking material into a liquefaction vessel onto a sloped lining on side wall portions of the vessel encircling a central cavity of the vessel, directing a plasma stream having a temperature of at least 5000° K. into the cavity whereby the pulverulent material is liquefied at a temperature no greater than 1315° C. and flows down the sloped surface of the lining and out of the vessel through a drain opening at a bottom portion of the cavity, the liquefied material being permitted to drain freely so that the material flows from the vessel before it becomes fully melted, and maintaining the rate of draining and the rate of feeding the pulverulent material onto the lining sufficient to cool the lining so that a stable layer of the lining is retained essentially unliquefied with a thickness sufficient to insulate the side wall portions of the vessel from heat in the cavity so that integrity of the side wall portions is maintained during continuous operation without forced external cooling.

2. The method of claim 1 wherein the lining comprises a layer of pulverulent material in contact with the material being liquefied.

3. The method of claim 1 wherein the liquefied material includes substantial amounts of unmelted material as it is drained from the liquefaction vessel.

4. The method of claim 1 wherein the material flows to the drain opening essentially unimpeded once it becomes liquefied, whereby the temperature of the liquefied material does not rise significantly above the temperature at which it initially liquefied.

5. The method of claim 1 wherein the plasma is formed in a stream of helium or steam.

6. The method of claim 1 wherein the plasma is formed in a stream of combustible gas and combustion of the gas takes place within the cavity.

7. The method of claim 1 wherein the side wall means are rotated about the cavity.

8. The method of claim 1 wherein the meltable material comprises a glass batch.

9. The method of claim 8 wherein the lining is maintained at least 3 centimeters thick.

10. The method of claim 8 wherein the liquefied material flows out of the cavity at a temperature no greater than about 1315° C.

11. The method of claim 1 wherein at least a surface portion of the lining facing the cavity is of a material compositionally compatible with the thermally meltable material.

12. The method of claim 1 wherein the stable layer lining is of essentially the same composition as the meltable material.

13. The method of claim 1 wherein the lining is maintained substantially constant without forced external cooling.

14. The method of claim 12 wherein the lining is comprised of glass batch.

15. The method of claim 1 wherein the lining is retained on a steel walled vessel, and the lining is of sufficient thickness to prevent thermal deterioration of the steel vessel.